(12) United States Patent
Zhang et al.

(10) Patent No.: US 12,417,574 B2
(45) Date of Patent: Sep. 16, 2025

(54) ANIMATION PROCESSING METHOD AND APPARATUS, ELECTRONIC DEVICE AND STORAGE MEDIUM

(71) Applicants: Beijing Bytedance Network Technology Co., Ltd., Beijing (CN); BYTEDANCE INC., Los Angeles, CA (US)

(72) Inventors: Jingcong Zhang, Los Angeles, CA (US); Beixin Hu, Beijing (CN); Yuanlong Chen, Beijing (CN); Zhili Chen, Los Angeles, CA (US); Linjie Luo, Los Angeles, CA (US); Jing Liu, Los Angeles, CA (US); Xiao Yang, Los Angeles, CA (US); Guohui Wang, Los Angeles, CA (US); Jianchao Yang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 175 days.

(21) Appl. No.: 18/005,547

(22) PCT Filed: Jul. 1, 2021

(86) PCT No.: PCT/CN2021/104074
§ 371 (c)(1),
(2) Date: Jan. 13, 2023

(87) PCT Pub. No.: WO2022/012349
PCT Pub. Date: Jan. 20, 2022

(65) Prior Publication Data
US 2023/0267664 A1   Aug. 24, 2023

(30) Foreign Application Priority Data
Jul. 16, 2020   (CN) .......................... 202010688598.3

(51) Int. Cl.
*G06T 13/20*   (2011.01)
*G06T 19/00*   (2011.01)
*G06T 19/20*   (2011.01)

(52) U.S. Cl.
CPC ............ *G06T 13/20* (2013.01); *G06T 19/006* (2013.01); *G06T 19/20* (2013.01); *G06T 2219/2016* (2013.01)

(58) Field of Classification Search
None
See application file for complete search history.

(56) References Cited

U.S. PATENT DOCUMENTS

2010/0026700 A1*   2/2010   Michail ................ G09G 5/363
                                                              345/582
2018/0330480 A1*  11/2018   Liu ........................ G06T 15/04
(Continued)

FOREIGN PATENT DOCUMENTS

CN   107506548 A   12/2017
CN   107728792 A    2/2018
(Continued)

OTHER PUBLICATIONS

ISA China National Intellectual Property Administration, International Search Report and Written Opinion issued in Application No. PCT/CN2021/104074, Sep. 28, 2021, WIPO, 10 pages.

*Primary Examiner* — Yanna Wu
(74) *Attorney, Agent, or Firm* — Alleman Hall & Tuttle LLP

(57) ABSTRACT

An animation processing method and apparatus, an electronic device and a storage medium, applied to a shader, the method including: acquiring an animation sample of a model unit; acquiring an external interaction parameter of an augmented reality model, where the augmented reality model includes a plurality of model units; and outputting the augmented reality model, and driving the animation sample (Continued)

of the model unit in the output augmented reality model according to the external interaction parameter. The animation sample of the model unit can be driven according to the external interaction parameter, so that animation of the model can be adjusted according to user operation, thereby improving usability.

14 Claims, 2 Drawing Sheets

(56) References Cited

U.S. PATENT DOCUMENTS

| | | |
|---|---|---|
| 2019/0122442 A1 | 4/2019 | Chen et al. |
| 2019/0156545 A1* | 5/2019 | Horn ........................ G06T 13/20 |
| 2023/0297166 A1* | 9/2023 | Martin ................ G06F 3/04815 |
| | | 345/156 |

FOREIGN PATENT DOCUMENTS

| | | |
|---|---|---|
| CN | 108803876 A | 11/2018 |
| CN | 110827376 A | 2/2020 |
| CN | 111862273 A | 10/2020 |

* cited by examiner

ANIMATION PROCESSING METHOD AND APPARATUS, ELECTRONIC DEVICE AND STORAGE MEDIUM

CROSS-REFERENCE TO RELATED APPLICATIONS

This application is a National Stage of International Application No. PCT/CN2021/104074, filed on Jul. 1, 2021, which claims the priority to Chinese patent application No. 202010688598.3 titled "ANIMATION PROCESSING METHOD AND APPARATUS, ELECTRONIC DEVICE AND STORAGE MEDIUM" and filed with the China National Intellectual Property Administration on Jul. 16, 2020. The entire contents of both of the above applications are incorporated into this application by reference in their entities.

TECHNICAL FIELD

The embodiments of the present disclosure relate to virtual reality technologies, and in particular, to an animation processing method and apparatus, an electronic device and a storage medium.

BACKGROUND

Augmented Reality (AR) is a technology in which real information and virtual information are superimposed. First, a computer system processes real information and generates, according to the real information, virtual information that matches the real information and is in the form of virtual objects, sound or text; and then, the virtual information is superimposed on a human-computer interaction interface that displays the real information, thereby enhancing the user's perception of the real world.

At present, the augmented reality animation of a landmark building is pre-baked animation. The content of the pre-baked animation is fixed, and the pre-baked animation content is played after playback is triggered. The pre-baked animation lacks interaction with a user, and the pre-baked images cannot be adjusted according to the user's operation, which is poor in usability.

SUMMARY

The present disclosure provides an animation processing method and apparatus, an electronic device and a storage medium, to achieve adjustment of model animation according to user operation, thereby improving usability.

In a first aspect, an embodiment of the present disclosure provides an animation processing method, applied to a shader, including:

acquiring an animation sample of a model unit;

acquiring an external interaction parameter of an augmented reality model, where the augmented reality model includes a plurality of model units; and outputting the augmented reality model, and driving the animation sample of the model unit in the output augmented reality model according to the external interaction parameter.

In a second aspect, an embodiment of the present disclosure further provides an animation generating apparatus, applied to a shader, including:

an animation sample acquiring module, configured to acquire an animation sample of a model unit;

an external interaction parameter acquiring module, configured to acquire an external interaction parameter of an augmented reality model, where the augmented reality model includes a plurality of model units;

a driving module, configured to output the augmented reality model, and drive the animation sample of the model unit in the output augmented reality model according to the external interaction parameter.

In a third aspect, an embodiment of the present disclosure further provides an electronic device, including:

one or more processors;

a storage apparatus, configured to store one or more programs, where the one or more programs, when executed by the one or more processors, cause the one or more processors to implement the animation processing method according to the embodiments of the present disclosure.

In a fourth aspect, an embodiment of the present disclosure further provides a storage medium, including a computer-executable instruction, where the computer-executable instruction, when executed by a computer processor, is used to execute the animation processing method according to the embodiments of the present disclosure.

In a fifth aspect, an embodiment of the present disclosure further provides a computer program product including a computer program instruction, where the computer program instruction causes a computer to execute the animation processing method according to the embodiments of the present disclosure.

In a sixth aspect, an embodiment of the present disclosure further provides a computer program, where the computer program, when run on a computer, causes the computer to execute the animation processing method according to the embodiments of the present disclosure.

According to the animation processing scheme disclosed in the embodiments of the present disclosure, the animation sample of the model unit having a parameter-passing interface can be generated, and when the user triggers the augmented reality, the external interaction parameter of the augmented reality model can be acquired, and the animation sample of the model unit can be driven using the external interaction parameter. At present, the user cannot control the preset model to change animation, which is poor in usability. According to the embodiments of the present disclosure, the animation sample of the model unit can be driven according to the external interaction parameter, so that the model animation can be adjusted according to user operation, thereby improving the usability.

DESCRIPTION OF EMBODIMENTS

The present disclosure will be further described in detail below in conjunction with the accompanying drawings and embodiments. It should be understood that the specific embodiments described herein are only used to explain the present disclosure, but not to limit the present disclosure. In addition, it should be noted that, the drawings only show some but not all structures related to the present disclosure for the convenience of description.

First Embodiment

Figure 1:
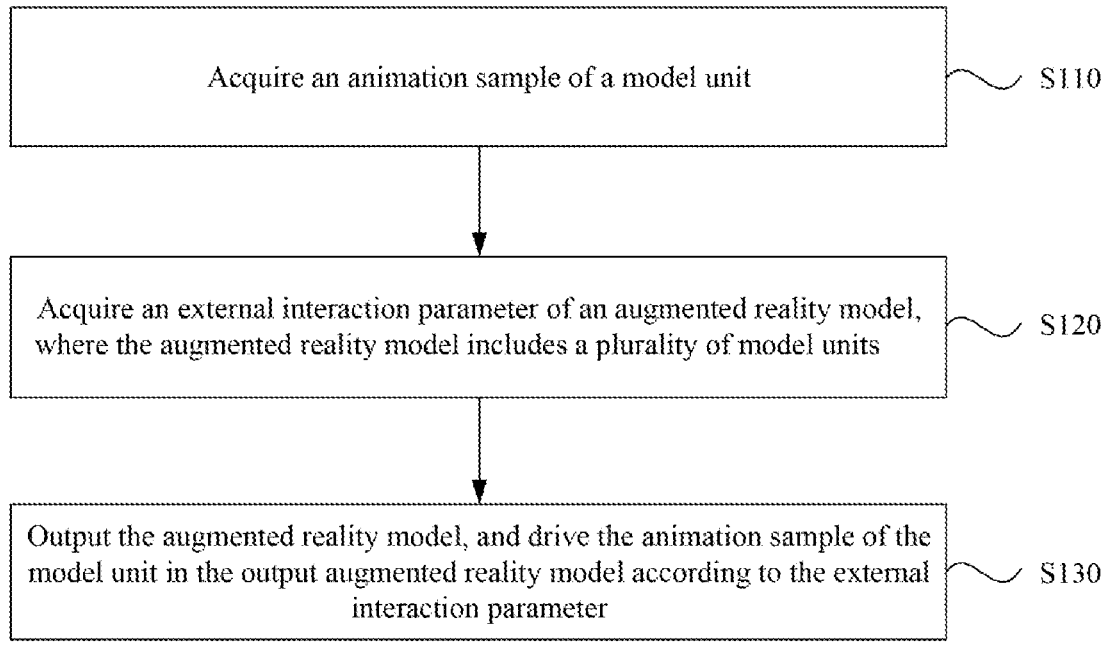
FIG. 1 is a flowchart of an animation processing method according to a first embodiment of the present disclosure.

FIG. 1 is a flowchart of an animation processing method according to the first embodiment of the present disclosure. The embodiment can be applied to a case of playing animation of an augmented reality model in augmented reality. The method can be performed by an electronic device that implements augmented reality, which may be a terminal such as a smartphone, a tablet computer, etc. The animation processing method specifically includes the following steps.

Step 110, acquiring an animation sample of a model unit.

The animation sample may be created in advance by 3D digital content creation (DCC) software. The 3D digital content creation software may be Houdini, which is suitable for making procedural animation. The animation example is also called a demo, and the augmented reality model involved in the embodiment of the present disclosure includes a plurality of model units. The model unit may have a fixed shape, such as a cubic box. The animation sample acquired in step 110 is a type of motion or deformation animation of a model unit. Different types of animation samples may be edited to match the display of the augmented reality model.

The pre-generated animation sample may be stored in a local memory, or the animation sample may be downloaded from a server and then cached locally to acquire the animation sample of the model unit.

In an implementation, the animation sample is a first animation sample. In this case, step 110 may be implemented to acquire a first animation sample of the model unit, where the first animation sample represents an animation of rotating the model unit along a preset coordinate axis at a center point of the model unit. In the animation sample creation software described above, the model unit is edited to complete creation of the first animation sample. In an implementation, the first animation sample provides a preset coordinate axis setting interface or a rotation angle setting interface, etc. In the subsequent step, a reference axis for the rotation of the model unit may be set through the preset coordinate axis setting interface, and the rotation angle of the model unit on the preset coordinate axis may be set through the rotation angle setting interface. Illustratively, the model unit shaped of a cube may be set to rotate continuously along the preset coordinate axis, or the model unit shaped of a cube may be set to rotate by a preset angle along a direction of the preset coordinate axis.

In another implementation, the animation sample is a second animation sample. In this case, step 110 may be implemented to acquire a second animation sample of the model unit, where the second animation sample represents an animation of the model unit jumping on a preset coordinate axis. In the animation sample creation software described above, the model unit is edited to complete creation of the second animation sample. In an implementation, the second animation sample provides a preset coordinate axis setting interface, a jumping frequency setting interface or a jumping amplitude setting interface, etc. In the subsequent step, a reference coordinate axis for the jumping of the model unit may be set through the preset coordinate axis setting interface, and the jumping direction of the model unit is parallel to the reference coordinate axis. The amplitude of the model unit jumping on the preset coordinate axis may be set through the jumping amplitude setting interface, and the frequency of the model unit jumping on the preset coordinate axis may be set through the jumping frequency setting interface, etc. Illustratively, the preset coordinate axis may be set for the model unit shaped of a cube to jump on, and the height or frequency of the model unit shaped of a cube to jump on the preset coordinate axis may be set.

In still another implementation, the animation sample is a third animation sample. In this case, step 110 may be implemented to acquire a third animation sample of the model unit, where the third animation sample represents that a surface texture or color of the model unit changes periodically. This animation sample may also change the surface texture of the model unit in addition to rotating or moving the model unit. For example, the surface of the model unit is a preset color or a preset texture in an initial state, and the surface pattern of the model unit in the third animation sample changes from the initial state (e.g., the preset color or the preset texture) to a target state, and then reverts from the target state to the initial state. The target state includes a target color or a target texture, and the target color may be a color with a fixed color difference from the preset color, and the target texture may be an actual surface texture of a captured object to which the augmented reality model is mapped, etc. If the model unit is a cubic unit, the color of a surface of the cube is an average value of colors of four vertices of the surface.

The interface provided by the animation samples above may receive different types of parameter-passing data. For example, a floating-point parameter may be received. The floating-point parameter is no longer a simple 0-1 trigger (0/1 represents triggering a certain animation or not triggering a certain animation), and the floating-point parameter can achieve smooth interacting effect. Procedural animation is implemented through a shader, and motion of each vertex is calculated by using a graphics processing unit (graphics processing unit, GPU), so that more complex visual effects can be accomplished in real time and efficiently.

The embodiment according to the present disclosure is applied to the graphics processing unit GPU, and the graphics processing unit performs operation on each model unit of the augmented reality model separately in a parallel manner, and thus it can be realized that each model unit of the augmented reality model executes the animation sample simultaneously.

Step 120: acquire an external interaction parameter of an augmented reality model, where the augmented reality model includes a plurality of model units.

A current augmented reality model can only play an animation sample according to a pre-baked fixed content, however, the animation sample cannot be adjusted according to an actual augmented reality scene, and thus the usability is poor and the animation effect is rigid, which affects the experience on augmented reality. In the present embodiment, the external interaction parameter of the augmented reality model can be acquired in step 102, and then the model unit can be controlled through the external interaction parameter.

Real-time sensing data may be acquired through a terminal sensor, and the sensing data may be converted into the external interaction parameter that can be used to drive the animation sample, according to the interface provided by the animation sample.

The user may start an augmented reality function in a preset application, which may be a camera function of the terminal, or an application with the augmented reality function. The terminal camera acquires a current image, and the terminal displays the acquired current image on a preview page. If it is recognized that there is a corresponding augmented reality model for a captured object in the current image, the augmented reality model is mapped to the building image. The captured object may be a landmark building, or may be entities corresponding to other pre-created augmented reality models, such as a vehicle.

For the convenience of description, the following embodiments take a model unit having the shape of a cubic unit as an example for description. In this case, the model unit is a cubic unit; the augmented reality model is a building model; and the building model includes a plurality of cubic units.

In an implementation, a preset coordinate axis of the first animation sample may be determined according to any of the following: a swiping direction of a swiping trajectory input by a user on a terminal screen; or a capturing direction of a terminal with respect to a captured object to which the augmented reality model is mapped; or a direction of movement of a camera of a terminal.

The preset coordinate axis in the first animation example is a rotation axis referred to when the model unit is rotated. When the user performs a swiping operation on the preview page displayed on the terminal screen, the touch panel can detect the trajectory corresponding to the swiping operation. The rotation axis can be determined according to the swiping direction of the trajectory. In an implementation, the rotation axis may be selected from three coordinate axes of the three-dimensional coordinate system, and the three coordinate axes are x-axis, y-axis and z-axis. The x-axis represents the lateral direction of the horizontal plane, the y-axis represents a vertical direction perpendicular to the plane and the z-axis represents the vertical direction of the horizontal plane. The swiping direction of the swiping trajectory can be used as the tangential direction when the cubic unit is rotated, and thus the rotation axis can be determined. For example, if the user swipes along the x-axis direction, the preset coordinate axis, i.e., the axis of rotation, is determined to be the z-axis.

The preset coordinate axis may also be determined according to a capturing direction of a terminal with respect to a captured object to which the augmented reality model is mapped. The capturing direction is mapped to a surface of the captured object, and then, the rotation direction of the cubic unit is determined, and further, the preset coordinate axis is determined. For example, the user is standing in front right of a building to capture the building, and in this case, when the capturing direction is mapped to the building, the direction is the negative direction of the x-axis, and the direction is the rotation direction of the cubic unit. Then, it is derived that the preset coordinate axis is the z-axis.

During the augmented reality process, the user may move. The longitudinal movement of the user may be determined from the size of the content in the image acquired by the camera, and the lateral movement of the user may be determined from the displacement of the object in the image acquired by the camera. A main movement direction may be determined from the longitudinal movement and the lateral movement, and the coordinate axis corresponding to the main movement direction is determined as the preset coordinate axis.

In the first animation example, after the preset coordinate axis is configured, the rotation angle may be a fixed value, such as a rotation of 90 degrees. It is also possible to rotate the cubic unit continuously after the rotation axis is determined. Further, the rotation speed, angle, etc. of the cubic unit may be adjusted according to user operation. When the cubic unit is rotated, world coordinates of the center point of the cubic unit may be stored in each vertex of the cubic unit.

Each vertex is rotated around the center point in the vertex shader. The color of the vertex uses the color of the center coordinate. The overall procedural animation of the building is that a plurality of cubic units on a surface or an axis are flipped in sequence to achieve a wave-like flipping procedural animation.

In an implementation, a jumping amplitude of the model unit jumping on the preset coordinate axis in the second animation sample is determined according to a beat, a downbeat or music intensity of target audio;

For the method of acquiring the preset coordinate axis for the second animation sample, reference may be made to the method of acquiring the preset coordinate axis for the first animation sample described above. In the second animation sample, the jumping amplitude of the model unit may be determined according to a beat, a downbeat or music intensity of target audio. The target audio may be a certain audio selected by the user, or may be the target audio that is bound to the augmented reality model and that is read by the terminal after the augmented reality model is recognized. For example, if the augmented reality model is a museum model, the target audio may be audio of introduction of the museum, or the background music currently played in the museum, etc. The target audio may be analyzed to determine the beat, downbeat or music intensity of the target audio. The heavier the beat and the stronger the music intensity, the greater the jumping amplitude.

In an implementation, the surface pattern of the model unit in the third animation sample is processed according to a Perlin noise algorithm.

The Perlin noise may be combined with the model vertex attributes and the interaction control parameter. The Perlin noise is introduced to the model vertices, so that the vertices of the cubic model unit are distributed in accordance with the surface feature of the building entity, and the effect is more three-dimensional rather than flat. The surface texture of the building is acquired through the terminal camera, and a surface pattern close to the actual surface texture of the building is simulated by the Perlin noise algorithm. The surface pattern is used as the target texture in the third animation sample. In this case, after the surface pattern of the model unit is changed to that surface pattern, the surface pattern can be maintained without reverting to the initial state.

Further, the third animation sample may be combined with the first animation sample and the second animation sample, to realize the rotation shown in the first animation sample or the jumping shown in the second animation sample after the Perlin noise processing is performed on the surface pattern of the model unit.

Further, attribute information of the model unit is set, where the attribute information includes one or more of: vertex coordinates, center point coordinates, a rotating start parameter or a jumping start parameter, the rotating start parameter represents whether the first animation sample is allowed to be driven, and the jumping start parameter represents whether the second animation sample is allowed to be driven.

In an embodiment of the present disclosure, attributes of the model unit may also be editable. The vertex coordinates may be the coordinates of respective vertices of the cube. The center point coordinates may be the coordinates of the center point of the cube. The jumping start parameter represents whether to allow a vertex to move, and boolean values may be used to represent allowance and prohibition. In an implementation, the rotating start parameter represents whether the model unit is allowed to rotate, and boolean values may be used to represent allowance and prohibition. In another implementation, the rotating start parameter represents the identification of the axis around which to rotate, for example, a Y-axis, an X-axis or a Z-axis, and the rotating start parameter may be represented by integer data. When only the rotation around two axes, such as the Y-axis and Z-axis, is allowed, Boolean values may be used to identify the Y-axis or Z-axis respectively.

Step 130: output the augmented reality model, and drive the animation sample of the model unit in the output augmented reality model according to the external interaction parameter.

When the augmented reality model is output, the model unit in the model is in the initial state. If the external interaction parameter triggered by the user is acquired in step 120, the external interaction parameter is passed to the shader through uniform of the shader, and each model unit is processed separately in the shader.

The external interaction parameter is passed into the animation sample by means of parameter-passing. The animation sample may be a combination of one or more of the first animation sample, the second animation sample or the third animation sample. After driving the animation sample, each cubic unit executes the animation sample and outputs a corresponding animation effect. For example, when the user swipes the screen, an animation effect of the cubic unit rolling in a wave form along the x-axis may be triggered, or when the terminal lens moves upward, an animation effect of the cubic unit rolling upward in a wave form may be triggered.

Further, an adjustment parameter is determined according to bone detection or face detection, where the adjustment parameter is used to control a driving degree of the first animation sample, the second animation sample or the third animation sample; and the model unit in the output augmented reality model is adjusted according to the adjustment parameter.

In a process of playing the animation sample, the terminal may try to acquire a new external interaction parameter and then update the driven animation sample. During or after playing an animation sample, the bone detection or the face detection may be performed. The actions made by the user in the air, such as, a gesture or body movement (e.g., nodding, running, or jumping) may be detected by the bone detection. The facial expression of the user may be detected by the face detection, and the user may be a target person being photographed (captured by a rear camera) or may be a user holding the terminal in hand (captured by a front camera). The adjustment parameter may be determined according to the facial expression or movement. The adjustment parameter may be an amplitude to increase or decrease of the current animation sample in accordance with a preset adjustment unit. Thus, the animation sample can be adjusted more precisely by the user.

According to the animation processing method disclosed in the embodiments of the present disclosure, the animation sample of the model unit having a parameter-passing interface can be generated, and when the user triggers the augmented reality, the external interaction parameter of the augmented reality model can be acquired, and the animation sample of the model unit can be driven using the external interaction parameter. At present, the user cannot control the preset model to change animation, which is poor in usability. According to the embodiments of the present disclosure, the animation sample of the model unit can be driven according to the external interaction parameter, so that the animation of the model can be adjusted according to user operation, thereby improving the usability.

Second Embodiment

Figure 2:
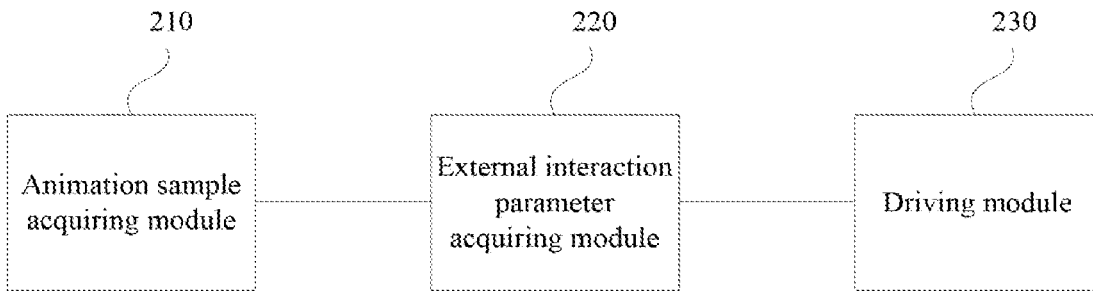
FIG. 2 is a schematic structural diagram of an animation processing apparatus according to a second embodiment of the present disclosure.

FIG. 2 is a schematic structural diagram of an animation processing apparatus according to the second embodiment of the present disclosure. The embodiment can be applied to a case of playing animation of an augmented reality model in augmented reality. The method can be performed by a device that implements augmented reality, which may be a smartphone, a tablet computer, etc. The apparatus includes: an animation sample acquiring module 210, an external interaction parameter acquiring module 220, and a driving module 230, where:

the animation sample acquiring module 210 is configured to acquire an animation sample of a model unit;

the external interaction parameter acquiring module 220 is configured to acquire an external interaction parameter of an augmented reality model, where the augmented reality model includes a plurality of model units; and the driving module 230 is configured to output the augmented reality model, and drive the animation sample of the model unit in the output augmented reality model according to the external interaction parameter.

Further, the animation sample acquiring module 210 is configured to:

acquire a first animation sample of the model unit, where the first animation sample represents an animation of rotating the model unit along a preset coordinate axis at a center point of the model unit;

acquire a second animation sample of a model unit, where the second animation sample represents an animation of the model unit jumping on a preset coordinate axis.

Further, the apparatus further includes a module attribute setting module, configured to:

set attribute information of the model unit, where the attribute information includes one or more of: vertex coordinates, center point coordinates, a rotating start parameter or a jumping start parameter, the rotating start parameter represents whether the first animation sample is allowed to be driven, and the jumping start parameter represents whether the second animation sample is allowed to be driven.

Further, the animation sample acquiring module 210 is configured to:

acquire a third animation sample of the model unit, where the third animation sample represents that a surface texture or color of the model unit changes periodically.

Further, the external interaction parameter acquiring module 220 is configured to:

determine a preset coordinate axis of the first animation sample according to any of the following: a swiping direction of a swiping trajectory input by a user on a terminal screen; or a capturing direction of a terminal with respect to a captured object to which the augmented reality model is mapped; or a direction of movement of a camera of a terminal; and determine a jumping amplitude of the model unit jumping on the preset coordinate axis in the second animation sample, according to a beat, a downbeat or music intensity of target audio; and process a surface pattern of the model unit in the third animation sample according to a Perlin noise algorithm.

Further, the apparatus further includes an adjusting module, configured to determine an adjustment parameter according to bone detection or face detection, where the adjustment parameter is used to control a driving degree of the first animation sample, the second animation sample or the third animation sample; and adjust the model unit in the output augmented reality model according to the adjustment parameter.

Further, the model unit is a cubic unit; the augmented reality model is a building model; and the building model includes a plurality of cubic units.

According to the animation processing apparatus disclosed in the embodiment of the present disclosure, the animation sample acquiring module 210 generates the animation sample of the model unit having a parameter-passing interface, and when the user triggers the augmented reality, the external interaction parameter acquiring module 220 acquires the external interaction parameter of the augmented reality model, and the driving module 230 drives the animation sample of the model unit using the external interaction parameter. At present, the user cannot control the preset model to change animation, which is poor in usability. According to the embodiments of the present disclosure, the animation sample of the model unit can be driven according to the external interaction parameter, so that the animation of the model can be adjusted according to user operation, thereby improving the usability.

The animation processing apparatus according to the embodiment of the present disclosure can execute the animation processing method according to any embodiment of the present disclosure, and has corresponding functional modules for executing the method and the beneficial effect.

Third Embodiment

Figure 3:
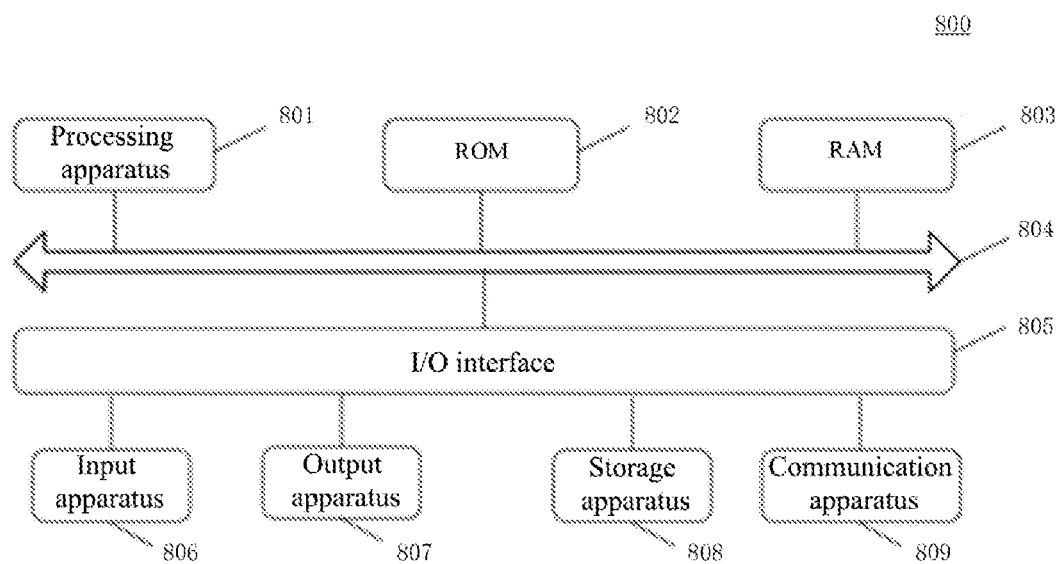
FIG. 3 is a schematic structural diagram of an electronic device according to a third embodiment of the present disclosure.

Referring to FIG. 3 below, it shows a schematic structural diagram of an electronic device 800 adapted to implementing the third embodiment of the present disclosure. The terminal device in the embodiment of the present disclosure may include, but is not limited to, a mobile device, such as a mobile phone, a notebook computer, a digital broadcast receiver, a PDA (personal digital assistant), a PAD (portable android device), a PMP (personal multimedia player), a vehicle terminal (e.g., a vehicle navigation terminal), etc., and a fixed terminal such as a digital TV (television), a desktop computer, etc. The electronic device shown in FIG. 3 is only an example, and should not bring any limitation to the function and scope of use of the embodiments of the present disclosure.

As shown in FIG. 3, the electronic device 800 may include a processing apparatus (such as a central processing unit, a graphics processor, etc.) 801, which may execute suitable actions and processing according to programs stored in a read-only memory (ROM for short) 802 or programs loaded into a random access memory (RAM for short) 803 from a storage apparatus 808. In the RAM 803, various programs and data required for the operation of the electronic device 800 are also stored. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806, including, for example, a touch screen, a touch pad, a keyboard, a mouse, a camera, a microphone, an accelerometer, a gyroscope, etc.; an output apparatus 807, including, for example, a liquid crystal display (LCD), a speaker, a vibrator, etc.; a storage apparatus 808, including, for example, a magnetic tape, a hard disk, etc.; and a communication apparatus 809. The communication apparatus 809 allows the electronic device 800 to perform wireless or wired communication with other devices to exchange data. Although FIG. 3 shows the electronic device 800 with various kinds of apparatuses, it is not required to implement or have all the apparatuses shown in FIG. 3. Alternatively, more or fewer apparatuses may be implemented or provided.

In particular, according to an embodiment of the present disclosure, the process described above with reference to the flowchart may be implemented as a computer software program. For example, an embodiment of the present disclosure includes a computer program product, which includes a computer program carried on a computer-readable medium, and the computer program contains program codes for executing the method shown in the flowchart. In such an embodiment, the computer program may be downloaded and installed from the network through the communication apparatus 809, or installed from the storage apparatus 808, or installed from the ROM 802. When the computer program is executed by the processing apparatus 801, the above-mentioned functions defined in the method of the embodiment of the present disclosure are executed.

It should be noted that the above-mentioned computer-readable medium in the present disclosure may be a computer-readable signal medium or a computer-readable storage medium, or any combination thereof. The computer-readable storage medium may be, for example, but not limited to, an electrical, a magnetic, an optical, an electromagnetic, an infrared, or a semiconductor system, apparatus, or device, or any combination thereof. More specific examples of the computer readable storage medium may include, but are not limited to: an electrical connection with one or more wires, a portable computer disk, a hard disk, a random access memory (RAM), a read only memory (ROM), an erasable programmable read-only memory (EPROM or flash memory), an optical fiber, a compact disc read-only memory (compact disc ROM, CD-ROM), an optical storage device, a magnetic storage device, or any suitable combination of the above. In the present disclosure, a computer-readable storage medium may be any tangible medium that includes or stores a program, and the program may be used by or in combination with an instruction execution system, apparatus, or device. In the present disclosure, a computer-readable signal medium may include a data signal propagated in a baseband or as a part of a carrier wave, and computer-readable program code is carried therein. This propagated data signal may take many forms, including but not limited to an electromagnetic signal, an optical signal, or any suitable combination thereof. The computer readable signal medium may also be any computer readable medium other than the computer readable storage medium, and the computer readable signal medium may send, propagate, or transmit the program used by or in combination with the instruction execution system, apparatus, or device. The program code contained on the computer readable medium may be transmitted by any suitable medium, including but not limited to: a wire, an optical cable, a RF (radio frequency), etc., or any suitable combination of the above.

The above-mentioned computer-readable medium may be included in the above-mentioned electronic device; or it may exist alone without being assembled into the electronic device.

The above computer-readable medium carries one or more programs, and when the foregoing one or more programs are executed by the electronic device, the electronic device is caused to: acquire at least two Internet protocol addresses; send a node evaluation request including the at least two Internet protocol addresses to a node evaluation device, where the node evaluation device selects an Internet protocol address from at least two Internet protocol addresses and returns the Internet protocol address; and receive the Internet protocol address returned by the node evaluation device; where the acquired Internet protocol address indicates an edge node in the content distribution network.

Alternatively, the above computer-readable medium carries one or more programs, and when the foregoing one or more programs are executed by the electronic device, the electronic device is caused to: receive a node evaluation request including the at least two Internet protocol addresses; select an Internet protocol address from the at least two Internet protocol addresses; return the selected Internet protocol address; where the received Internet protocol address indicates an edge node in the content distribution network.

The present disclosure also provides a computer program that causes a computer to perform the animation processing method according to the above-described embodiments.

The computer program code used to perform the operations of the present disclosure may be written in one or more programming languages or a combination thereof. The above-mentioned programming languages include object-oriented programming languages—such as Java, Smalltalk, C++, and also include conventional procedural programming language—such as "C" language or similar programming languages. The program code may be executed entirely on a user computer, partly on a user computer, executed as an independent software package, partly executed on a user computer and partly executed on a remote computer, or entirely executed on a remote computer or server. In the case of a remote computer, the remote computer may be connected to a user computer through any kind of network, including a local area network (LAN for short) or a wide area network (WAN for short), or it may be connected to an external computer (for example, using an Internet service provider to connect through the Internet).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of code, and the module, the program segment, or the part of code contains one or more executable instructions for implementing a designated logical function. It should also be noted that, in some alternative implementations, the functions marked in the blocks may also occur in a different order from the order indicated in the drawings. For example, two blocks shown one after another may actually be executed substantially in parallel, or sometimes may be executed in a reverse order, which depends on the functions involved. It should also be noted that each block in the block diagram and/or flowchart, and the combination of the blocks in the block diagram and/or flowchart, may be implemented by a dedicated hardware-based system that performs the specified functions or operations, or it may be implemented by a combination of dedicated hardware and computer instructions.

The units involved in the embodiments described in the present disclosure may be implemented in software or hardware. A name of a unit does not constitute a limitation on the unit itself in some cases. For example, a first acquiring unit may also be described as "a unit that acquires at least two Internet Protocol addresses".

The above description is only preferred embodiments of the present disclosure and explanation of the applied technical principles. Those skilled in the art should understand that the scope of disclosure involved in the present disclosure is not limited to the technical solutions formed by the specific combination of the above technical features, and should also cover other technical solutions formed by the above technical features or equivalent features without departing from the above disclosed concept. For example, the above-mentioned features and the technical features disclosed in the present disclosure (but not limited to) having similar functions are replaced with each other to form a technical solution.

The invention claimed is:

1. An animation processing method, applied to a shader, comprising:
    acquiring an animation sample of a model unit, wherein the animation sample has a parameter-passing interface, the parameter-passing interface is configured to convert real-time sensing data acquired through a terminal sensor into an external interaction parameter, and the external interaction parameter comprises a preset coordinate axis;
    acquiring the external interaction parameter of an augmented reality model according to the parameter-passing interface, wherein the augmented reality model includes a plurality of model units; and
    outputting the augmented reality model, and driving the animation sample of the model unit in the output augmented reality model according to the external interaction parameter,
    wherein the acquiring the animation sample of the model unit comprises:
        acquiring a first animation sample of the model unit, wherein the first animation sample represents an animation of rotating the model unit along the preset coordinate axis at a center point of the model unit;
        acquiring a second animation sample of the model unit, wherein the second animation sample represents an animation of the model unit jumping on the preset coordinate axis; and
        acquiring a third animation sample of the model unit, wherein the third animation sample represents that a surface texture or color of the model unit changes periodically, and
    wherein the acquiring the external interaction parameter of the augmented reality model according to the parameter-passing interface comprises:
        determining the preset coordinate axis of the first animation sample according to any of the following: a swiping direction of a swiping trajectory input by a user on a terminal screen; or a capturing direction of a terminal with respect to a captured object to which the augmented reality model is mapped; or a direction of movement of a camera of the terminal;
        determining a jumping amplitude of the model unit jumping on the preset coordinate axis in the second animation sample, according to a beat, a downbeat, or music intensity of target audio; and
        processing a surface pattern of the model unit in the third animation sample according to a Perlin noise algorithm.

2. The method according to claim 1, wherein before outputting the augmented reality model, the method further comprises:
setting attribute information of the model unit, wherein the attribute information comprises one or more of: vertex coordinates, center point coordinates, a rotating start parameter or a jumping start parameter, the rotating start parameter represents whether the first animation sample is allowed to be driven, and the jumping start parameter represents whether the second animation sample is allowed to be driven.

3. The method according to claim 2, wherein the external interaction parameter comprises at least one of the jumping amplitude of the model unit on the preset coordinate axis and the surface pattern of the model unit.

4. The method according to claim 1, wherein after driving the animation sample of the model unit in the output augmented reality model according to the external interaction parameter, the method further comprises:
determining an adjustment parameter according to bone detection or face detection, wherein the adjustment parameter is used to control a driving degree of the first animation sample, the second animation sample or the third animation sample; and
adjusting the model unit in the output augmented reality model according to the adjustment parameter.

5. The method according to claim 1, wherein the model unit is a cubic unit; the augmented reality model is a building model; and the building model comprises a plurality of cubic units.

6. An animation generating apparatus, applied to a shader, comprising:
at least one processor; and
a memory communicatively connected to the at least one processor; wherein,
the memory stores instructions executable by the at least one processor, and the instructions are executed by the at least one processor, so that the at least one processor is configured to:
acquire an animation sample of a model unit, wherein the animation sample has a parameter-passing interface, the parameter-passing interface is configured to convert real-time sensing data acquired through a terminal sensor into an external interaction parameter, and the external interaction parameter comprises a preset coordinate axis;
acquire the external interaction parameter of an augmented reality model according to the parameter-passing interface, wherein the augmented reality model includes a plurality of model units;
output the augmented reality model, and drive the animation sample of the model unit in the output augmented reality model according to the external interaction parameter;
acquire a first animation sample of the model unit, wherein the first animation sample represents an animation of rotating the model unit along the preset coordinate axis at a center point of the model unit;
acquire a second animation sample of the model unit, wherein the second animation sample represents an animation of the model unit jumping on the preset coordinate axis;
acquire a third animation sample of the model unit, wherein the third animation sample represents that a surface texture or color of the model unit changes periodically;
determine the preset coordinate axis of the first animation sample according to any of the following: a swiping direction of a swiping trajectory input by a user on a terminal screen; or a capturing direction of a terminal with respect to a captured object to which the augmented reality model is mapped; or a direction of movement of a camera of the terminal;
determine a jumping amplitude of the model unit jumping on the preset coordinate axis in the second animation sample, according to a beat, a downbeat, or music intensity of target audio; and
process a surface pattern of the model unit in the third animation sample according to a Perlin noise algorithm.

7. The animation generating apparatus according to claim 6, wherein the at least one processor is further configured to:
set attribute information of the model unit, wherein the attribute information comprises one or more of: vertex coordinates, center point coordinates, a rotating start parameter or a jumping start parameter, the rotating start parameter represents whether the first animation sample is allowed to be driven, and the jumping start parameter represents whether the second animation sample is allowed to be driven.

8. The animation generating apparatus according to claim 7, wherein the external interaction parameter comprises at least one of the jumping amplitude of the model unit on the preset coordinate axis and the surface pattern of the model unit.

9. The animation generating apparatus according to claim 6, wherein the at least one processor is further configured to:
determine an adjustment parameter according to bone detection or face detection, wherein the adjustment parameter is used to control a driving degree of the first animation sample, the second animation sample or the third animation sample; and
adjust the model unit in the output augmented reality model according to the adjustment parameter.

10. The animation generating apparatus according to claim 6, wherein the model unit is a cubic unit; the augmented reality model is a building model; and the building model comprises a plurality of cubic units.

11. A non-transitory storage medium, comprising a computer-executable instruction, wherein the computer-executable instruction, when executed by a computer, causes the computer to implement steps of:
acquiring an animation sample of a model unit, wherein the animation sample has a parameter-passing interface, the parameter-passing interface is configured to convert real-time sensing data acquired through a terminal sensor into an external interaction parameter, and the external interaction parameter comprises a preset coordinate axis;
acquiring the external interaction parameter of an augmented reality model according to the parameter-passing interface, wherein the augmented reality model includes a plurality of model units;
outputting the augmented reality model, and driving the animation sample of the model unit in the output augmented reality model according to the external interaction parameter;
acquiring a first animation sample of the model unit, wherein the first animation sample represents an animation of rotating the model unit along the preset coordinate axis at a center point of the model unit;

acquiring a second animation sample of the model unit, wherein the second animation sample represents an animation of the model unit jumping on the preset coordinate axis;

acquiring a third animation sample of the model unit, wherein the third animation sample represents that a surface texture or color of the model unit changes periodically;

determining the preset coordinate axis of the first animation sample according to any of the following: a swiping direction of a swiping trajectory input by a user on a terminal screen; or a capturing direction of a terminal with respect to a captured object to which the augmented reality model is mapped; or a direction of movement of a camera of the terminal;

determining a jumping amplitude of the model unit jumping on the preset coordinate axis in the second animation sample, according to a beat, a downbeat, or music intensity of target audio; and processing a surface pattern of the model unit in the third animation sample according to a Perlin noise algorithm.

12. The non-transitory storage medium according to claim 11, wherein the computer-executable instruction, when executed by a computer, further causes the computer to implement the following steps:

setting attribute information of the model unit, wherein the attribute information comprises one or more of: vertex coordinates, center point coordinates, a rotating start parameter or a jumping start parameter, the rotating start parameter represents whether the first animation sample is allowed to be driven, and the jumping start parameter represents whether the second animation sample is allowed to be driven.

13. The non-transitory storage medium according to claim 12, wherein the external interaction parameter comprises at least one of the jumping amplitude of the model unit on the preset coordinate axis and the surface pattern of the model unit.

14. The non-transitory storage medium according to claim 11, wherein the computer-executable instruction, when executed by a computer, further causes the computer to implement the following steps:

determining an adjustment parameter according to bone detection or face detection, wherein the adjustment parameter is used to control a driving degree of the first animation sample, the second animation sample or the third animation sample; and adjusting the model unit in the output augmented reality model according to the adjustment parameter.

* * * * *